(12) United States Patent
Umeda et al.

(10) Patent No.: US 10,647,147 B2
(45) Date of Patent: May 12, 2020

(54) ANTI-COUNTERFEITING MEDIUM

(71) Applicant: TOPPAN PRINTING CO., LTD., Tokyo (JP)

(72) Inventors: Kozue Umeda, Tokyo (JP); Mihoko Okawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/196,180

(22) Filed: Nov. 20, 2018

(65) Prior Publication Data

US 2019/0084337 A1 Mar. 21, 2019

Related U.S. Application Data

(63) Continuation of application No. PCT/JP2017/019070, filed on May 22, 2017.

(30) Foreign Application Priority Data

May 23, 2016 (JP) ................................ 2016-102746

(51) Int. Cl.
*B42D 25/328* (2014.01)
*B42D 25/364* (2014.01)
(Continued)

(52) U.S. Cl.
CPC ............. *B42D 25/328* (2014.10); *B42D 5/04* (2013.01); *B42D 25/324* (2014.10);
(Continued)

(58) Field of Classification Search
CPC ............................ B42D 25/328; B42D 25/364
See application file for complete search history.

(56) References Cited

U.S. PATENT DOCUMENTS

| 6,955,839 B2 * | 10/2005 | Gocho ................. B42D 25/364 |
| | | 235/380 |
| 7,511,796 B2 * | 3/2009 | Katschorek .......... B42D 25/328 |
| | | 283/90 |

(Continued)

FOREIGN PATENT DOCUMENTS

| JP | 2001-063300 A | 3/2001 |
| JP | 2008-183832 A | 8/2008 |

(Continued)

OTHER PUBLICATIONS

International Search Report regarding PCT/JP2017/019070, dated Aug. 1, 2017, 2 pps.

*Primary Examiner* — Kyle R Grabowski
(74) *Attorney, Agent, or Firm* — Foley & Lardner LLP

(57) ABSTRACT

A anti-counterfeiting medium includes a support substrate, an OVD forming layer, and a latent image layer in this order. The latent image layer has plural regions with optical axes of a birefringent material aligned in directions different from each other. The OVD forming layer includes an uneven-structure-forming layer is made up of a first region and a second region, and a reflecting layer. The first region is a region made up of a flat part and plural convexities or concavities. The second region is configured by a flat part. Each of the plural convexities and concavities has a 0.3 to 5 μm long side dimension and short side dimension and height or depth of 0.1 to 0.5 μm or less.

6 Claims, 9 Drawing Sheets

(51) Int. Cl.
    *G09F 3/02*          (2006.01)
    *B42D 5/04*          (2006.01)
    *G09F 3/00*          (2006.01)
    *B42D 25/324*       (2014.01)
    *B42D 25/373*       (2014.01)
    *G02B 5/18*          (2006.01)
    *G02B 5/30*          (2006.01)

(52) U.S. Cl.
    CPC ......... *B42D 25/364* (2014.10); *B42D 25/373* (2014.10); *G02B 5/1861* (2013.01); *G09F 3/02* (2013.01); *G09F 3/0292* (2013.01); *G02B 5/3083* (2013.01)

(56) References Cited

U.S. PATENT DOCUMENTS

| | | | | |
|---|---|---|---|---|
| 7,808,605 B2* | 10/2010 | Hoffmuller | .......... | B42D 25/364 283/114 |
| 8,322,753 B2* | 12/2012 | Hoshino | .............. | B42D 25/328 283/115 |
| 8,709,553 B2* | 4/2014 | Amimori | ............. | G02B 5/3016 283/72 |
| 2007/0085334 A1* | 4/2007 | Watanabe | ............ | B42D 25/328 283/72 |
| 2008/0138543 A1* | 6/2008 | Hoshino | .............. | B42D 25/328 428/29 |
| 2008/0272883 A1* | 11/2008 | Toda | ...................... | B42D 25/00 340/5.8 |

FOREIGN PATENT DOCUMENTS

| | | |
|---|---|---|
| JP | 2012-198431 A | 10/2012 |
| JP | 2015-221523 A | 12/2015 |

\* cited by examiner

ANTI-COUNTERFEITING MEDIUM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/019070, filed on May 22, 2017, which is based upon and claims the benefit of priority to Japanese Patent Application No. 2016-102746, filed on May 23, 2016, the disclosures of which are all hereby incorporated herein by reference in their entireties.

TECHNICAL FIELD

The present invention relates to an anti-counterfeiting medium and an anti-counterfeiting adhesive label having an anti-counterfeiting effect.

BACKGROUND ART

Optical variable devices (OVDs) are often used as anti-counterfeit means. OVDs include holograms, diffraction gratings, multilayer films, and the like. OVDs, using light interference, display a stereo image or a decorative image which produces a color change depending on the observation angle. In addition to such visual effects, advanced technology is required for manufacturing OVDs. Accordingly, OVDs are used as display bodies for preventing counterfeiting of credit cards, securities, certificates, notes, tickets, or the like. Additionally, OVDs have recently been used as authentication labels to prove authenticity of a genuine product, or for a sealing label to seal the packaging of a product.

However, the widespread use of OVDs have resulted in distribution of counterfeit products having a visual effect similar to that of genuine OVDs.

Recently, a latent image device applied with polarized technology has been proposed. The proposed latent image device visualizes a latent image by observation through a polarizing film and enables authentication. However, to determine authenticity of the latent image device, a dedicated verifier such as a polarizing film, is required. Generally, retailers and service providers provide dedicated verifiers for authentication corresponding to the latent image device received from a consumer to determine the authenticity of the device. However, hardly any information as to whether a latent image device has been used is available to average consumers. Accordingly, it is difficult for the average consumers to acquire in advance the verifiers corresponding to those latent image devices which would be acquired in various circumstances.

As to this problem, JP 2001-63300 A proposes an anti-counterfeiting medium provided with both an OVD enabling authentication to some extent by average consumers, and a latent image device enabling authentication by retailers and service providers (see PTL 1). The latent image device in this proposal includes a latent image portion and a non-latent image portion. The latent image portion, which is optically anisotropic, does not form a latent image when observed under ordinary light (unpolarized light), but forms a latent image when observed under polarized light. The non-latent image portion, which is optically isotropic, does not form any image when observed under ordinary light or polarized light.

CITATION LIST

[Patent Literature] PTL 1: JP 2001-63300 A

SUMMARY OF THE INVENTION

Technical Problem

In general, conventional holograms produce iridescent change in an image by using relief diffraction gratings including plural grooves. However, iridescently shining reflected light makes it difficult (for an observer) to confirm the change in the image by the latent image device.

To further improve the design, reflecting layers are colored in patterns in conventional holograms. However, the coloring of the pattern requires printing, or the like, of a colored ink onto the reflecting layer. When printing a colored ink, there arise problems of complicating the manufacturing, and degrading luminance of an image formed by a hologram.

The present invention is intended to solve the aforementioned conventional problems, and aims to provide an anti-counterfeiting medium that exhibits a stronger anti-counterfeiting effect.

Solution to Problem

An anti-counterfeiting medium of a first embodiment of the present invention includes a support substrate, an OVD forming layer, and a latent image layer in this order, characterized in that: the latent image layer includes a birefringent material; the latent image layer has plural regions with an optical axes of the birefringent material aligned in directions different from each other; the OVD forming layer includes in order from the support substrate side, an uneven-structure-forming layer and a reflecting layer; the uneven-structure-forming layer is made up of one or more first regions and one or more second regions; the reflecting layer is provided on at least the one or more first regions of the uneven-structure-forming layer; each of the one or more first regions is selected from a group consisting of: (a) a region made up of a flat part substantially parallel to a surface of the support substrate, and plural convexities each having an upper surface substantially parallel to a surface of the support substrate; and (b) a region made up of a flat part substantially parallel to a surface of the support substrate, and plural concavities each having a bottom surface substantially parallel to a surface of the support substrate; the second region is configured by a flat part substantially parallel to a surface of the support substrate, and each of the plural convexities has a long side dimension of 0.3 µm or more and 10 µm or less, a short side dimension of 0.3 µm or more and 10 µm or less, and a depth of 0.1 µm or more and 0.5 µm or less; each of the plural concavities has a long side dimension of 0.3 µm or more and 10 µm or less, a short side dimension of 0.3 µm or more and 10 µm or less, and a depth of 0.1 µm or more and 0.5 µm or less; in each of the one or more first regions;

(1) the plural convexities or concavities occupy an area of 20% or more and 80% or less with respect to an area of the first region;

(2) the plural convexities or the plural concavities are orderly arranged; and (3) the plural convexities have a substantially uniform height or the plural concavities have a substantially uniform depth. The latent image layer may include, in order from the OVD forming layer side, an alignment film and a birefringent film containing the birefringent material. The birefringent material may be a liquid crystal material. Further, it is preferable that at least two of plural regions of the latent image layer are arranged above the each of the one or more first regions in terms of providing distinctive designability. The anti-counterfeiting medium of the present embodiment may further include a printed layer, and the printed layer may be provided on the surface of the support substrate on a side opposite to the surface on which the OVD forming layer is provided, or the printed layer may be provided between the OVD forming layer and the latent image layer to further achieve designability.

The anti-counterfeiting adhesive label of a second embodiment of the present invention is characterized in that the label includes the anti-counterfeiting medium of the first embodiment and an adhesive layer, and the adhesive layer is provided to a support substrate side of the anti-counterfeiting medium.

Advantageous Effects of the Invention

With the aforementioned configuration, an OVD forming layer displays an image having a single color layer according to the incidence of illumination light. Accordingly, the iridescent image does not rely on the illumination angle change or the observation angle change as in holograms or relief diffraction gratings. Consequently, an image (light-and-dark pattern) that is produced by the latent image layer can be readily visually recognized. By providing plural regions having convexities or concavities with different height or depth to the OVD forming layer, the regions can display an image with colors different between the regions. Providing plural regions in the OVD forming layer is easy, and luminance of the image displayed by the regions will not be degraded. Furthermore, in combination with an image that is produced by the latent image layer, an inimitable design can be achieved. Use of the anti-counterfeiting medium having the aforementioned configuration enables a higher degree of authentication.

DESCRIPTION OF REPRESENTATIVE EMBODIMENTS

Figure 1:
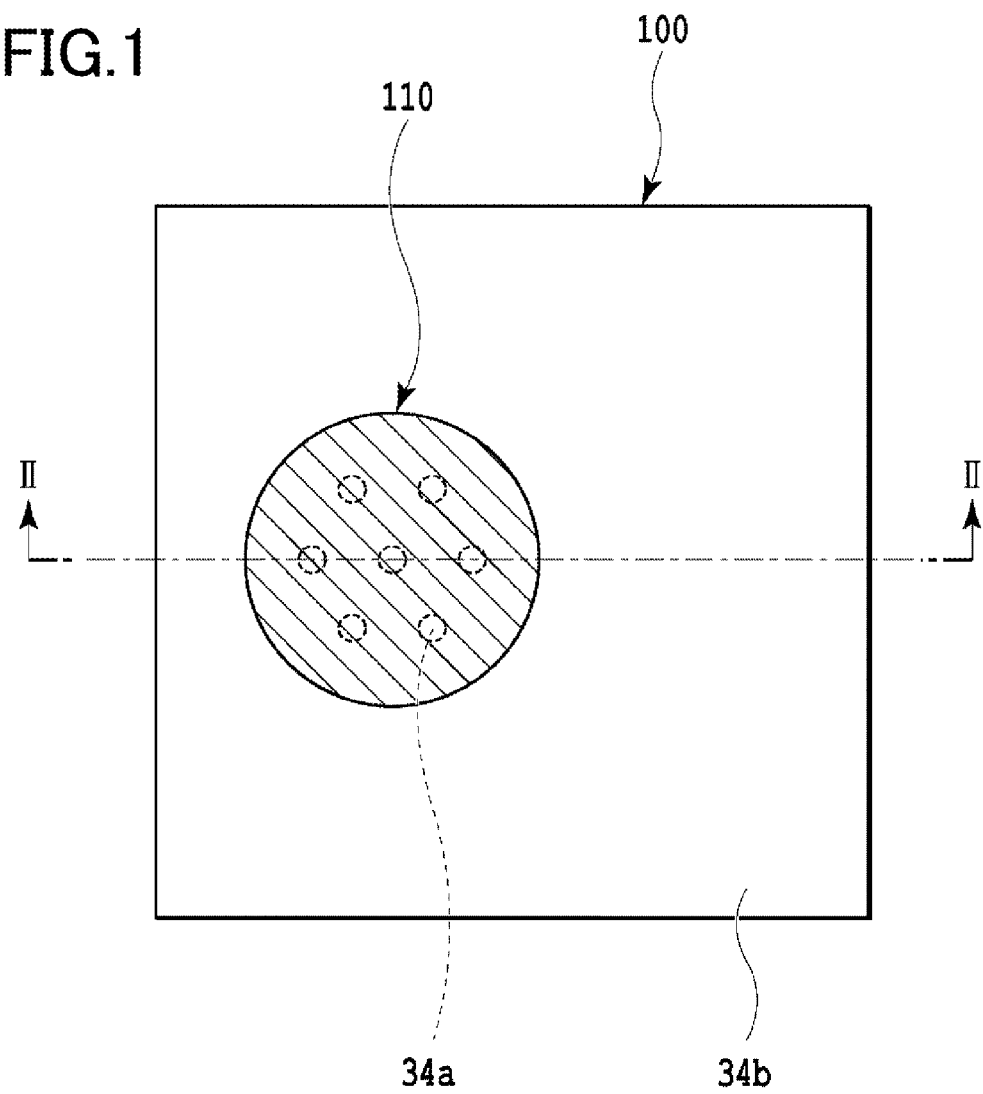
FIG. 1 is a top view of an anti-counterfeiting medium observed under unpolarized illumination light, according to a first configuration example of the present invention.

With reference to the drawings, embodiments of the present invention will be described in detail. It is to be understood that the present invention is not limited to the following embodiments, which are intended to be representative of the present invention. The representative embodiments described below are merely examples of the present invention, and the design thereof could be appropriately changed by one skilled in the art. Incidentally, unless there is a reason for the sake of convenience, the same reference signs will be used for identical components, and redundant explanations will be omitted. It will be noted that in the drawings, like or corresponding parts are designated by like reference numerals and redundant illustrations therefor are omitted. The dimensional ratios in the drawings should not be construed as limited to those ratios shown therein.

An anti-counterfeiting medium including a support substrate, an OVD forming layer, and a latent image layer in this order, is characterized in that the latent image layer includes a birefringent material; the latent image layer has plural regions with an optical axes of the birefringent material aligned in directions different from each other; the OVD forming layer includes in order from the support substrate side, an uneven-structure-forming layer and a reflecting layer; the uneven-structure-forming layer is made up of one or more first regions and one or more second regions; the reflecting layer is provided on at least the one or more first regions of the uneven-structure-forming layer; each of the one or more first regions is selected from a group consisting of: (a) a region made up of a flat part substantially parallel to a surface of the support substrate, and plural convexities each having an upper surface substantially parallel to a surface of the support substrate; and (b) a region made up of a flat part substantially parallel to a surface of the support substrate, and plural concavities each having a bottom surface substantially parallel to a surface of the support substrate; the second region is configured by a flat part substantially parallel to a surface of the support substrate, and each of the plural convexities has a long side dimension of 0.3 µm or more and 10 µm or less, a short side dimension of 0.3 µm or more and 10 µm or less, and a depth of 0.1 µm or more and 0.5 µm or less; each of the plural concavities has a long side dimension of 0.3 µm or more and 10 µm or less, a short side dimension of 0.3 µm or more and 10 µm or less, and a depth of 0.1 µm or more and 0.5 µm or less; and in each of the one or more first regions;

(1) the plural convexities or concavities occupy an area of 20% or more and 80% or less with respect to an area of the first region;

(2) the plural convexities or the plural concavities are orderly arranged; and (3) the plural convexities have a substantially uniform height or the plural concavities have a substantially uniform depth.

Figure 2:
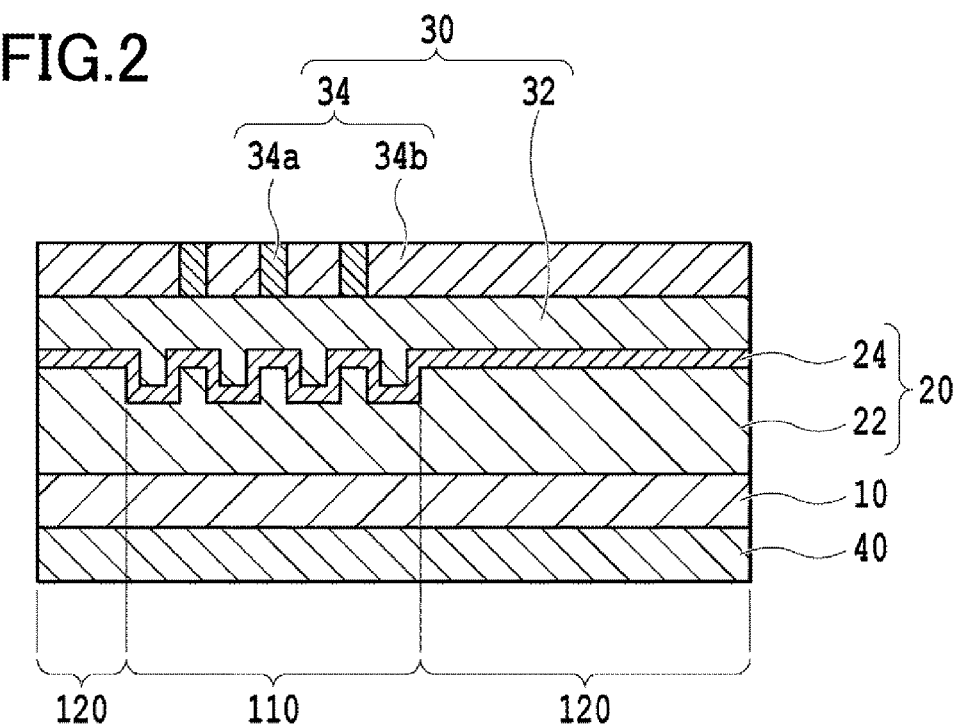
FIG. 2 is a cross-sectional view of the anti-counterfeiting medium taken along the line II-II, according to the first configuration example of the present invention.

FIG. 1 shows a top view of an anti-counterfeiting medium 100 observed under unpolarized illumination light from vertically above, according to a first configuration example of the present invention, and FIG. 2 shows a cross-sectional view taken along the line II-II of FIG. 1. The anti-counterfeiting medium of the first configuration example of the present invention shown in FIGS. 1 and 2 includes a support substrate 10, an OVD forming layer 20 made up of an uneven-structure-forming layer 22 and a reflecting layer 24, a latent image layer 30 made up of an alignment film 32 and a birefringent layer 34, in this order. In the example shown in FIGS. 1 and 2, the uneven-structure-forming layer 22 has one first region 110 and one second region 120. In the example shown in FIGS. 1 and 2, the first region 110 is made up of plural convexities each having an upper surface substantially parallel to a surface of the support substrate 10, and a flat part also substantially parallel to the surface of the support substrate 10. The second region 120 is configured by a flat part substantially parallel to the surface of the support substrate 10. The birefringent layer 34 includes a first birefringent region 34a and a second birefringent region 34b, that is, the latent image layer 30 is made up of two regions. FIGS. 1 and 2 show a structure of an anti-counterfeiting medium 100 in the form of an anti-counterfeiting label in which the support substrate 10 is provided with an adhesive layer 40.

The support substrate 10 is made of a flexible material and has a flat surface. The support substrate 10 may be transparent or may be non-transparent. As a material for the support substrate 10, a plastic may be used. The material for forming the support substrate 10 may be polyesters such as polyethylene terephthalate (PET) or polybutylene terephthalate (PBT), polycarbonates, poly(meth)acrylates, polyimides, or the like.

As an option, a first adhesive layer (not shown) may be provided between the support substrate 10 and the OVD forming layer (specifically, the uneven-structure-forming layer 22) to improve adhesion between the support substrate 10 and the OVD forming layer (or the uneven-structure-forming layer 22).

The uneven-structure-forming layer 22, which is a first component of the OVD forming layer 20, can be formed of a thermoplastic resin, a photo-curable resin, or the like. When using a thermoplastic resin, the resin is applied onto the support substrate 10, followed by pressing a stamper of a predetermined uneven structure against the coating film of the thermoplastic resin, for plastic deformation of the coating film, thereby forming a flat part, convexities or concavities configuring the first region, and a flat part configuring the second region. When using a photo-curable resin, the resin is applied onto the support substrate 10, followed by pressing a stamper of a predetermined uneven structure against the coating film of the photo-curable resin, for irradiation of light to the coating film in this state, for curing, thereby forming a flat part, and convexities or concavities configuring the first region, and a flat part configuring the second region. As the resin for the uneven-structure-forming layer 22, an acrylic resin, a urethane resin, an olefin resin, an epoxy resin, or the like can be used. The uneven-structure-forming layer 22 may have a thickness of 0.5 µm or more and 5 µm or less.

The original plate of the stamper for forming the uneven-structure-forming layer 22 may be produced by photolithography as in the process of producing a conventional relief diffraction grating. For example, the original plate can be obtained by substantially uniformly coating a planar substrate with a photosensitive resist, followed by irradiating, in a pattern, a photosensitive resist coating film with a charged particle beam such as an electron beam (EB), or the like, or an actinic light such as a laser or the like, and then finally, developing the photosensitive resist coating film. Generally, a glass substrate may be used as a planar substrate. At the developing stage, when the photosensitive resist is of a positive type, portions irradiated with a charged particle beam or an actinic light are dissolved and removed. When the photosensitive resist is of a negative type, portions irradiated with a charged particle beam or an actinic light are insolubilized, and unirradiated portions are dissolved and removed. For example, a substrate may be placed on an XY stage whose position is highly accurately adjustable, and a charged particle beam or an actinic light may be applied to the substrate, while the stage is moved under the control of a computer.

Next, a stamper is formed by using the original plate. This is because the uneven structure formed of the photosensitive resist of the original plate is too fragile for pressing in the process of forming the uneven-structure-forming layer 22. Using a method such as electroforming, a metal stamper with the uneven structure of the original plate transferred onto it is produced. In the electroforming method, the metal stamper is produced by adhering a conductive layer onto the photosensitive resist coating film provided to the original plate and having an uneven structure, immersing the entire original plate in an aqueous solution containing metal ions, and energizing the conductive layer to thereby reduce and/or deposit the metal ions on the conductive layer. The conductive layer can be formed by adhering a conductive metal onto the photosensitive resist coating film having an uneven structure by vapor phase deposition such as vacuum deposition, sputtering, or the like known in the art. The electroforming method is preferable in that an inverted shape of the fine uneven structure, which is provided on the photosensitive resist coating film of the original plate, can be highly accurately transferred onto the surface of the metal stamper.

The uneven-structure-forming layer 22 has one or more first regions 110 and one or more second regions. The first region 110 and the second region 120 may be collectively arranged in a pattern for displaying a letter, a picture, a design, a logotype, a mark, or the like.

The first region 110 may be (a) a region made up of a flat part substantially parallel to the surface of the support substrate 10, and plural convexities each having an upper surface substantially parallel to the surface of the support substrate 10, or (b) a region made up of a flat part substantially parallel to the surface of the support substrate 10, and plural convexities each having a bottom surface substantially parallel to the surface of the support substrate 10. In the present specification, the term "substantially parallel to" related to a flat part, a concavity and a convexity, refers to the angle between the surface of the flat part, the top surface of the convexity, or the bottom surface of the concavity, and the surface of the support substrate 10 being in the range of −5° to +5°. The plural convexities or the plural concavities in the first region, have a long side dimension in the range of 0.3 µm or more and 10 µm or less, and preferably 0.3 µm or more and 5 µm or less, and a short side dimension in the range of 0.3 µm or more and 10 µm or less, and preferably 0.3 µm or more and 5 µm or less. In the present specification, the "long side dimension" and the "short side dimension" of the plural convexities or the plural concavities refer to the lengths of the long side and the short side, respectively, of the minimum rectangle circumscribing the upper surface shape of each convexity or concavity. Accordingly, the plural convexities or the plural concavities each having the long side dimension and the short side dimension within the aforementioned ranges, each have an upper surface shape that can be contained inside the rectangle having a long side and a short side in the range of 0.3 µm or more and 10 µm or less, and preferably 0.3 µm or more and 5 µm or less. The plural convexities or plural concavities may each be in a cylindrical shape having an upper surface in a shape of a circle, an ellipse, a polygon or in other shapes. For example, when the plural convexities or the plural concavities each have a circular upper surface, the long side and the short side will have an equivalent value. When the plural convexities or the plural concavities each have an elliptical upper surface, the long side corresponds to the long axis of the ellipse, and the short side corresponds to the short axis of the ellipse. The plural convexities or concavities may each desirably be in a vertical and cylindrical shape standing upright. With the long side dimension and the short side dimension being within the aforementioned ranges, diffracted light having sufficient intensity can be emitted at an azimuthal angle direction sufficiently different from the incident direction of the illumination light. With these dimensions, the uneven-structure-forming layer 22 can be readily formed.

Figure 5:
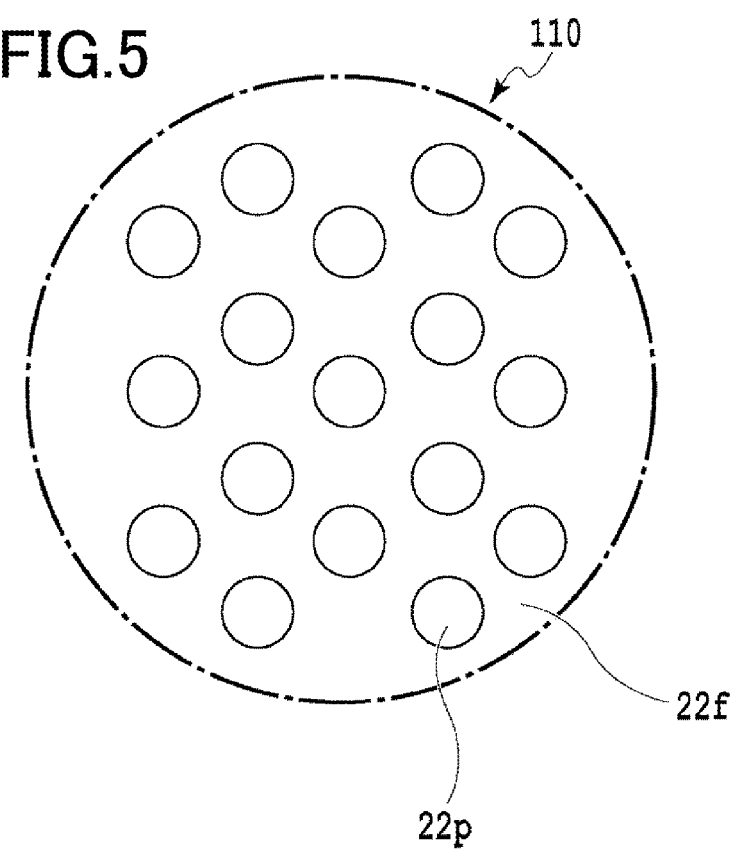
FIG. 5 is an enlarged top view of an uneven-structure-forming layer in a first region.

The plural convexities or the plural concavities are orderly arranged in the first region 110. For example, FIG. 5 shows a top view of the first region 110 in which the plural concavities 22p are defined in the flat part 22f and orderly arranged. The term "orderly arranged" in the present specification refers to a state in which the plural convexities or the plural concavities are arranged regularly at equal intervals.

When illumination light is incident on the upper surface structure shown in FIG. 5, reflected light from the plural convexities 22p interferes with reflected light from the flat part 22f around the convexities 22p, thereby emitting diffracted light. As shown in FIG. 5, in the case of a structure where the plural convexities 22p are orderly arranged, diffracted light is emitted at multiple azimuthal angles. Furthermore, illumination light is incident not on one point but on a region having some degree of area. Generally, illumination light is not formed of a single wavelength alone, but has some range of wavelength distribution. At a fixed point, plural diffracted lights from multiple points are simultaneously observed by an observer. The plural diffracted lights have respective wavelength distributions, that is, hues different from each other, depending on the respective diffracted angles. Accordingly, the observer recognizes the resultant combination of the plural diffracted lights. Specifically, the observer recognizes a single light having a wavelength distribution, that is, a hue different from any of the diffracted lights.

In order to have the observer recognize the single light resulting from the combination of the plural diffracted lights in the structure in which the plural convexities 22p are orderly arranged, it is preferable that the long side dimension and the short side dimension of the plural convexities 22p are each in the range of 5 µm to 10 µm. The difference in the emission angle of the diffracted light with respect to each wavelength component of the illumination light is small as apparent from Equation 1. Therefore, when the plural convexities 22p having the long side dimension and the short side dimension within the aforementioned range are used, the displayed color is not a so-called iridescent color even when the positions of the illumination light source and/or of the observer changes. Thus, a hue of the single light (i.e., the specific wavelength distribution) resulting from the combination of the plural diffracted lights can be observed stably.

$$d = m\lambda(\sin\alpha - \sin\beta) \quad \text{(Equation 1)}$$

(In the equation, d represents a grating constant of the diffraction grating, m represents a diffraction order, λ represents a wavelength of incident light and reflected light, α represents an incident angle of incident light, and β is an output angle of reflected light.)

Use of the orderly arranged plural concavities or the convexities leads to an advantage of being able to obtain diffracted light having less stray light.

The first region 110 made up of the flat part 22f and the plural convexities 22p shown in FIG. 5, has been described in detail, but the same effect of the orderly arrangement applies to a first region made up of a flat part and plural concavities.

The height of the plural convexities or the depth of the plural concavities in the first region 110 is preferably 0.1 µm and more and 0.5 µm or less. With the height and the depth of this range, convexities or concavities can be precisely formed without being affected by external factors during manufacture (variations in machines and/or in the surrounding environment, slight variations in the material composition of the uneven-structure-forming layer 22, and the like), and high diffraction efficiency can be achieved. Note that the conditions under which the diffraction efficiency reaches the maximum are periodically present even at a height or depth larger than the aforementioned range. However, a larger height or depth may make it more difficult to control the manufacturing conditions. The "height" of the plural convexities in the present specification refers to a vertical distance from the upper surface of the flat part to the upper surface of each convexity in the first region 110. Similarly, the "depth" of the plural concavities in the present specification refers to a vertical distance from the upper surface of the flat part to the upper surface of each concavity in the first region 110.

In diffracted light emitted from the diffractive structure, the light intensity, that is, the diffraction efficiency, changes depending on the wavelength. In generally used diffraction gratings, when the width and the pitch of the grid line are taken to be constant, diffraction efficiency is uniquely determined by the height of the diffraction grating and the wavelength of illumination light. For the OVD forming layer 20 of the present invention as well, when the first region 110 is observed from a fixed point, the diffraction efficiency of light of a specific waveform decreases, depending on the height of the plural convexities or the depth of the plural concavities in the first region 110. Consequently, even when white light is used as illumination light, the observed light becomes colored light whose specific component is weakened due to the difference in diffraction efficiency of the visible-range components contained in white light. In other words, to know which component in the visible range is weakened depends on the height of the plural convexities or the depth of the plural concavities in the first region 110. Accordingly, by providing plural first regions 110, with the height of the plural convexities or the depth of the concavities being different between the first regions, light with a different hue, that is, a different wavelength distribution, is provided to the observer from each first region 110.

In each of one or more first regions 110 in the anti-counterfeiting medium 100 of the present invention, the height of the plural convexities or the depth of the plural concavities are set to be substantially the same. In the present specification, the term "substantially the same" refers to the difference in height or difference in depth is within 0.1 µm. Additionally, the flat part, and the plural convexities or the plural concavities configuring the first region 110, each have a surface substantially parallel to the surface of the support substrate 10. With these configurations, it is possible to reduce only the diffraction efficiency of light in a specific wavelength range, and not to reduce the diffraction efficiency of light in other wavelength ranges. Accordingly, each of one or more first regions 110 in the anti-counterfeiting medium 100 of the present invention can provide the observer with light having a hue of a high chroma level.

In each of one or more first regions 110, an occupation area of the plural convexities or the plural concavities is in the range of 20% or more and 80% or less with reference to the area of the first region 110. When the plural concavities or the plural convexities occupy 50% of the area, the brightest display image can be obtained. However, with the occupation area within the aforementioned range, an image, which is sufficiently recognizable and exerts sufficient eye-catching effect, can be obtained, although there may be observed a decrease in luminance due to a decrease in diffraction efficiency.

Unlike the conventional diffracted gratings, the first region 110 of the uneven-structure-forming layer 22 emits diffracted light at multiple azimuthal angles. Even if there is a slight change in the position of the light source of the illumination light, the observation point and/or the observation direction, the observer can observe the hue, that is, the light having a wavelength distribution, due to the aforementioned combination of the diffracted light. Accordingly, the phenomenon of so-called iridescent change produced by conventional diffraction gratings can be prevented or mitigated in a hue of the observed light. Accordingly, the latent image of the birefringent layer 34 can be readily observed.

The second region 120 of the uneven-structure-forming layer 22 provides a region that reflects illumination light without imparting any optical effect thereto. The uneven-structure-forming layer 22 of the flat part in the second region 120 may have a thickness matching the thickness of the uneven-structure-forming layer 22 of the flat part in the first region 110, or the thickness of the uneven-structure-forming layer 22 in the plural convexities in the first region 110, or the thickness of the uneven-structure-forming layer 22 in the plural concavities in the first region 110. Alternatively, in the flat part of the second region 120, the uneven-structure-forming layer 22 may have a thickness that is different from any portions of the uneven-structure-forming layer 22 in the first region 110.

The reflecting layer 24, which is the second element configuring the OVD forming layer 20, improves the reflection efficiency in the OVD forming layer 20 and makes it easy for the observer to visually recognize the diffraction effect in the first region 110, the reflection effect in the second region 120, and the latent image provided by the latent image layer 30 under the polarized light irradiation conditions described later.

The reflecting layer 24 is formed by adhesion of a metallic material containing aluminum, silver, gold, an alloy thereof, or the like. The adhesion of the metallic material may be performed by any method such as vacuum deposition, sputtering, plating, or the like known in the art. The reflecting layer 24 may have a thickness of 10 nm or more and 300 nm or less.

The reflecting layer 24 is provided on at least one or more first regions 110 of the uneven-structure-forming layer 22. The reflecting layer 24 may or may not be provided on one or more second regions 120 of the uneven structure forming layer 22. FIGS. 1 and 2 show an example of the reflecting layer 24 formed on the entire surface of the uneven-structure-forming layer 22. In the first region 110 of the uneven-structure-forming layer 22, the reflecting layer 24 has an upper surface configuration conforming to the flat part, the convexities and/or the concavities of the uneven-structure-forming layer 22.

The alignment film 32, which is the first component of the latent image layer 30 aligns the birefringent material in the birefringent layer 34 formed thereon, in a specific direction. Furthermore, the alignment film 32 provides a smooth upper surface to achieve an appropriate alignment of the birefringent material. The alignment film 32 preferably has a thickness of 0.1 μm or more and 3 μm or less. The alignment film 32 is provided between the OVD forming layer 20 and the birefringent layer 34 to mitigate the unevenness of the OVD forming layer 20, and reduce the influence of the unevenness to the birefringent layer 34. When the birefringent layer 34 is made of a liquid crystal material, the alignment of the liquid crystal material is affected by the unevenness of the alignment film 32, and thus unnecessary scattering effect is likely to occur on the birefringent layer 34 due to the unevenness of the OVD forming layer 20. The alignment film 32 also has an effect to adhere the birefringent layer 34 onto the OVD forming layer 20. The alignment film 32 may have a laminated structure of plural layers. For example, there may be used a laminated structure having a coating layer for providing a smooth upper surface, and an alignment layer formed on the coating layer. The coating layer may be formed of a urethane resin, or the like. In this case, the coating layer may contain a coloring material that develops color by absorbing a laser during laser printing. The alignment layer, described later in detail, may be formed of a rubbing alignment material, a photo-alignment material or the like.

The alignment film 32 of the present invention has plural regions that provide different alignments to the birefringent material. The alignment film 32 is formed through alignment processing such as a rubbing alignment method, a photo-alignment method, or the like.

The rubbing alignment method is a method of rubbing the polymer coating film in a specific direction with a cloth or the like to change the characteristics of the surface of the alignment film 32 in the rubbed direction and align the birefringent material formed thereon. When using the rubbing alignment method, the alignment film 32 is formed of a material such as polyimide, polyvinyl alcohol (PVA), or the like. The formation of the two regions providing different alignments through the rubbing alignment method may include, for example, a step of covering a part of the polymer coating film with a first mask, a step of performing rubbing in a first direction, a step of removing the first mask, a step of covering a portion subjected to rubbing in the first direction with a second mask, and a step of performing rubbing on a portion not covered with the second mask in a second direction different from the first direction. Alternatively, another method may be used, including a step of performing rubbing in a first direction on the entire surface of the polymer coating film, a step of covering a part of the polymer coating film with a first mask, and a step of performing rubbing in a second direction different from the first direction on a part not covered with the first mask.

The photo-alignment is a method inducing rearrangement or induction of anisotropic chemical reaction of photo-anisotropic molecules in a photo-anisotropic molecular coating film by (a) application of light having anisotropy (e.g., polarized light) to the photo-anisotropic molecular coating film or (a) application of isotropic light (e.g., unpolarized light) to the photo-anisotropic molecular coating film from a slant direction. Molecular rearrangements or anisotropic chemical reactions include (i) photoanisotropy of azobenzene derivatives, (ii) photodimerization or cross-linking of cinnamic acid esters, coumarin, chalcone, benzophenone, or derivatives thereof, (iii) photolysis of polyimides or the like. The formation of the two regions providing different alignments by the photo-alignment method may include a step of covering a part of the photo-anisotropic molecular coating film with a first mask, a step of irradiating the coating film with light having a first anisotropy, a step of removing the first mask, a step of covering a portion irradiated with light with a second mask, and a step of irradiating a portion not covered with the second mask with light having a second anisotropy different from the first anisotropy. Alternatively, another method may be used, including a step of irradiating the entire surface of the light anisotropic molecular coating film with light having a first anisotropy, a step of covering a part of the light anisotropic molecular coating film with a first mask, and a step of irradiating the coating film with light having a second anisotropy different from the first anisotropy may be employed. The step of irradiating the coating film with light having the first and second anisotropy may be replaced by the step of irradiating the isotropic light from the first slant direction and the second slant direction, respectively.

The formation of the polymer coating film when using the rubbing alignment method and the formation of the photo-anisotropic molecular coating when using the photo-alignment method may be performed by any method such as gravure coating, microgravure coating, or the like known in the art.

The birefringent layer 34, which is the second component of the latent image layer 30, contains a birefringent material, and has plural regions aligned in different directions. FIGS. 1 and 2 exemplify a configuration including two regions, the first birefringent region 34a and the second birefringent region 34b.

The term birefringent refers to a phenomenon where the refractive index differs depending on the direction of polarization. When polarized light whose polarization direction does not coincide with the optical axis (slow axis or fast axis) of the birefringent material is incident, the incident polarized light is separated into an ordinary ray and an extraordinary ray.

The birefringent material which can be used for the present invention includes a liquid crystal material. Non-limiting examples of the liquid crystal material include photocurable liquid crystal monomers having acrylate groups at both ends of a mesogenic group, liquid crystal polymers cured by irradiation with an EB or ultraviolet light (UV), grafted liquid crystal polymers in which a mesogenic group is grafted to a non-liquid crystalline polymer main chain, and liquid crystalline polymers containing a mesogenic group in the polymer main chain.

The birefringent material (liquid crystal material) in the birefringent layer 34 forms the first birefringent region 34a and the second birefringent region 34b made of a birefringent material (liquid crystal material) aligned in different directions according to the alignment processing of the alignment film 32 which underlies the birefringent layer 34. When a liquid crystal material is used as the birefringent material, the liquid crystal material exhibits a nematic phase. In this case, the alignment of the liquid crystal material can be promoted by applying the liquid crystal material on the alignment film 32 and then heating the birefringent layer 34 to a temperature slightly below the N-I point at which the liquid crystal material undergoes a nematic phase-isotropic phase transition. The angle between the optical axis of the birefringent material in the first birefringent region 34a and the optical axis of the birefringent material in the second birefringent region 34b may preferably be in the range of 5° to 90°, more preferably in the range of 22.5° to 67.5°. By setting the aforementioned angle, the latent image can be readily recognized when observed through the polarizing plate.

The birefringent layer 34 preferably has a thickness of 0.1 μm or more and 1 μm or less. When polarized light, whose polarization direction does not coincide with the optical axis of the birefringent material, enters and an ordinary ray and an extraordinary ray are separated from each other, the optical paths of the ordinary ray and the extraordinary ray are different due to the difference in refractive index. However, with the film thickness of the aforementioned range, the exit positions of the ordinary ray and the extraordinary ray when reflected by the reflecting layer 24 and transmitted through the birefringent layer 34 again are within the coherence range. Additionally, the polarization direction of light outputted from the birefringent layer 34 can be obtained by vector synthesis of the ordinary ray and the extraordinary ray.

It is desirable that the birefringent layer 34 has transparency that is enough to observe a pattern having a dimension of 0.05 mm to 1 mm formed in the uneven-structure-forming layer 22. For example, it is desirable that the image sharpness C (0.125) measured using an optical comb width of 0.125 mm according to JISK-7374:2007 is 90% or more. With such transparency, micro characters formed in the uneven-structure-forming layer 22 it can be clearly observed through the birefringent layer 34. Counterfeiting the anti-counterfeiting medium of the present invention can be made extremely difficult by multiplexed authentication accompanied by verification using a polarizing plate and verification using micro letters, which will be described later.

Furthermore, a second adhesive layer (not shown) may be provided between the OVD forming layer 20 and the latent image layer 30, and more specifically, between the reflecting layer 24 and the alignment film 32 to improve adhesion between the OVD forming layer 20 and the latent image layer 30. The adhesive layer may be formed of a resin. As the resin, a thermosetting resin may be used. As the thermosetting resin, a urethane resin may be used. The adhesive layer may have a thickness of 0.1 μm or more and 1 μm or less. Additionally, since the latent image layer 30 is easily damaged by abrasion and the like, a protective layer (not shown) may be provided to the surface of the latent image layer 30 on a side opposite to the OVD forming layer 20. The protective layer may be also imparted with hard coating properties. The hard coating properties may correspond to a hardness of H or more and 5H or less in a pencil hardness test (JISK5600-5-4).

The adhesive layer 40 using the anti-counterfeiting medium 100 of the present invention as an anti-counterfeiting label is provided to the support substrate 10 side of the anti-counterfeiting medium 100. In the configuration example shown in FIGS. 1 and 2, the adhesive layer is provided to the support substrate 10 on a side opposite to the OVD forming layer 20. The adhesive layer 40 may be formed using any adhesive known in the art, such as a pressure sensitive adhesive. Non-limiting examples of the adhesive include an acrylic adhesive, a butyl rubber adhesive, a natural rubber adhesive, a silicone adhesive, a polyester adhesive, and a polyamide adhesive.

An incision may be provided to the adhesive layer 40 or the support substrate 10 so that the anti-counterfeiting medium 100 would be broken when an attempt is made to peel away the anti-counterfeiting label bonded to an article. A portion having a high interlayer adhesion strength and a portion having a low interlayer adhesion strength may be provided between the adhesive layer 40 and the support substrate 10. In this case, when the anti-counterfeiting label is attempted to be peeled off, a brittle fracture would occur between the portion having a high interlayer adhesion strength and the portion having a low interlayer adhesion strength, thereby breaking the anti-counterfeiting medium 100.

The following description addresses how the anti-counterfeiting medium 100 of the present invention appears when observed using unpolarized illumination light or in the observation condition through a polarizing plate. FIG. 1 is a top view showing the anti-counterfeiting medium 100 observed under ordinary unpolarized illumination light. In this case, neither the first birefringent region 34a nor the second birefringent region 34b of the birefringent layer 34 can be visually recognized. Accordingly, in the first region 110, a colored image due to the unevenness of the OVD forming layer 20 (the uneven-structure-forming layer 22 and the reflecting layer 24) is visually recognized, and in the second region 120, light reflected by the flat reflecting layer 24 is visually recognized.

Figure 3:
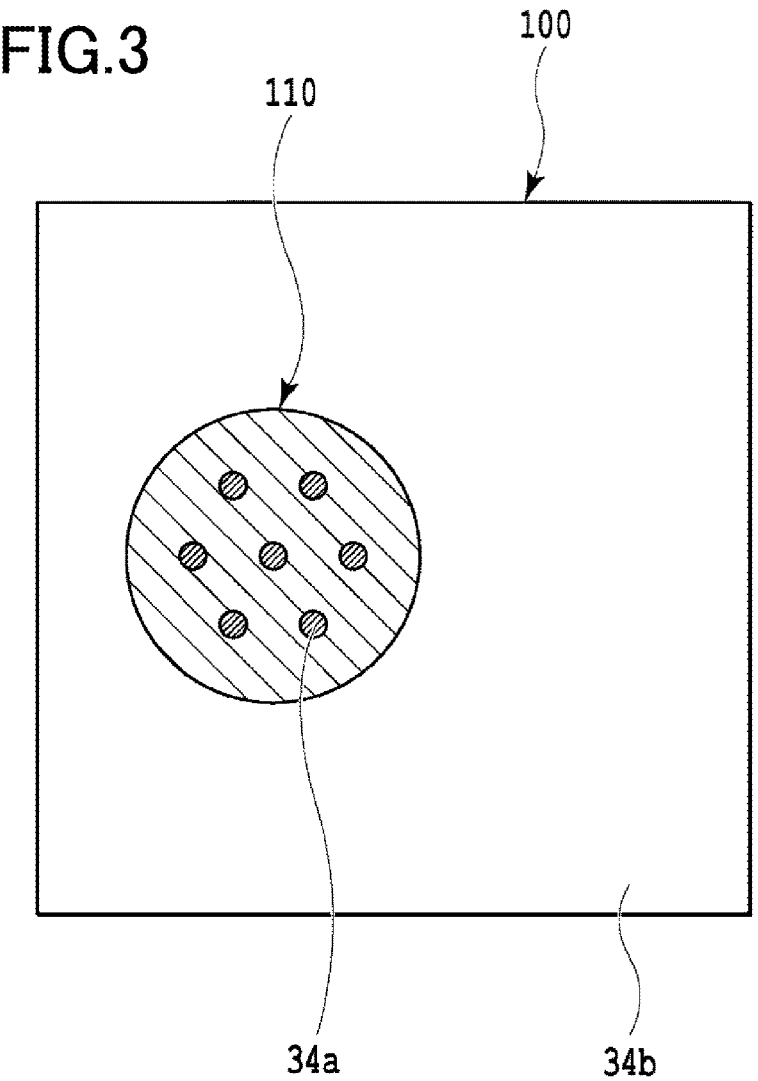
FIG. 3 is a top view of the anti-counterfeiting medium observed through a polarizing plate in a first condition, according to the first configuration example of the present invention.

FIG. 3 shows the anti-counterfeiting medium 100 observed through a polarizing plate under the first condition. The example of FIG. 3 shows the optical transmission axis of the polarizing plate being parallel to the optical axis of the birefringent material in the second birefringent region 34b. Light passed through the polarizing plate is linearly polarized in the optical transmission axis direction, and enters the birefringent layer 34. In the second region 120, since the direction of the linearly polarized light and the optical axis of the birefringent material are parallel to each other (fast axis or slow axis), separation between an ordinary ray and an extraordinary ray does not occur, and either the ordinary ray or the extraordinary ray is transmitted. Next, the light reflected at the fixed end on the surface of the reflecting layer 24 enters the birefringent layer 34 again. In this case as well, since an ordinary ray or an extraordinary ray is parallel to the optical axis of the birefringent material, reflected light is transmitted as it is. As described above, since no change occurs in the polarization direction when reflected light passes through the birefringent layer 34 twice, light outputted from the second birefringent region 34b of the birefringent layer 34 is polarized in a direction parallel to the optical transmission axis of the polarizing plate. Accordingly, the second birefringent region 34b is recognized as a bright region.

The optical axis of the birefringent material in the first birefringent region 34a is not parallel to the optical transmission axis of the polarizing plate. Therefore, the linearly polarized light passing through the polarizing plate is separated into an ordinary ray and an extraordinary ray in the birefringent layer 34. Subsequently, the ordinary ray and the extraordinary ray reflected at the fixed end on the surface of the reflecting layer 24 are incident on and transmitted through the birefringent layer 34 again. The ordinary ray and the extraordinary ray are mutually shifted in phase by $\pi$ (radians) due to the reflection at the fixed end on the surface of the reflecting layer 24. Therefore, the polarization direction of the emission light of the anti-counterfeiting medium 100 obtained by vector synthesis of the ordinary ray and the extraordinary ray is not parallel to the optical transmission axis of the polarizing plate. Namely, the polarization direction is rotated by two passes of reflected light through the birefringent layer 34 and reflection in the reflecting layer 24. Consequently, the polarization components passing through the polarizing plate are reduced, so that the first birefringent region 34a is recognized as a dark region.

As described above, since the luminance of the emission light is different between the first birefringent region 34a and the second birefringent region 34b, the observer can recognize the latent image (the configurations of the first birefringent region 34a and the second birefringent region 34b). Additionally, due to the unevenness of the OVD forming layer 20 (the uneven-structure-forming layer 22 and the reflecting layer 24), the difference in hue between the first region 110 and the second region 120 can be continuously observed. Therefore, the anti-counterfeiting medium of the present invention displays an inimitable image that is a combination of a hue pattern that can be observed under normal observation conditions with a light-and-dark pattern that cannot be observed under normal observation conditions.

Figure 4:
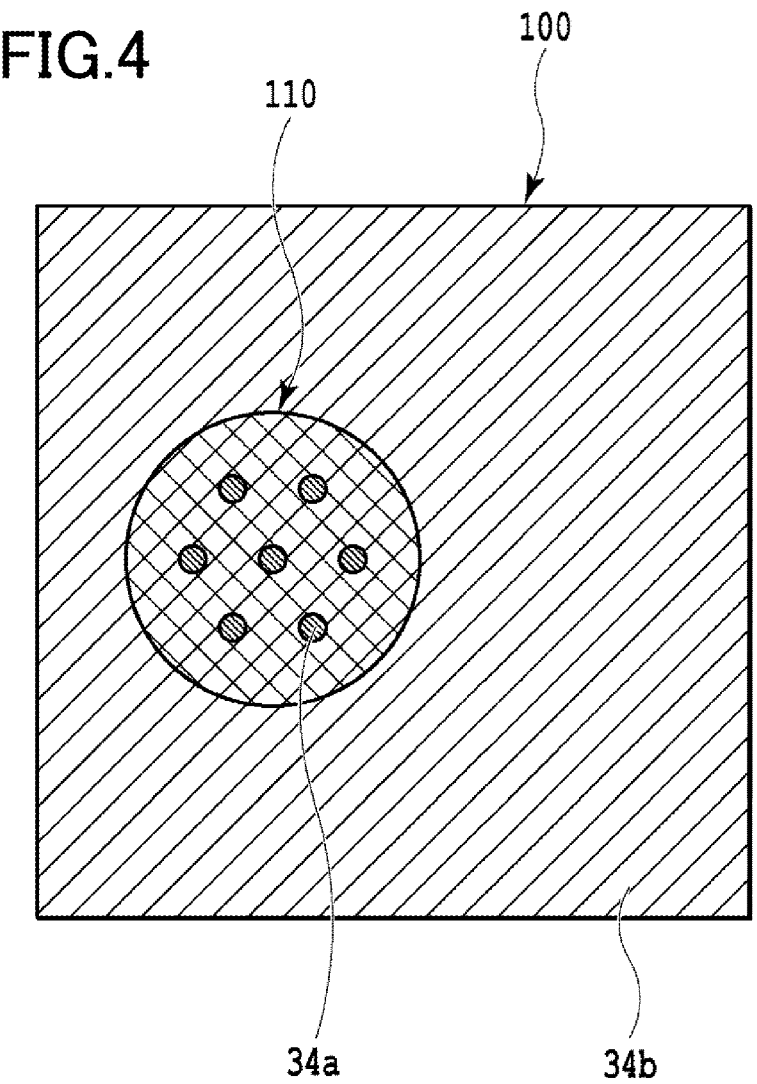
FIG. 4 is a top view of the anti-counterfeiting medium observed through the polarizing plate in a second condition that is different from the first condition, according to the first configuration example of the present invention.

FIG. 4 shows the anti-counterfeiting medium 100 observed through a polarizing plate under the second condition that is different from the first condition. The example of FIG. 4 shows the optical transmission axis of the polarizing plate being parallel to the optical axis of the birefringent material in the first birefringent region 34a. In this case, in contrast to FIG. 3, the first birefringent region 34a is recognized as a bright region, and the second birefringent region 34b is recognized as a dark region. Accordingly, even under the condition shown in FIG. 4, the observer can observe the latent image (the configurations of the first birefringent region 34a and the second birefringent region 34b), and the difference in hue between the first region 110 and the second region 120. Therefore, the anti-counterfeiting medium 100 of the present invention displays an inimitable image that is a combination of a hue pattern that can be observed under normal observation conditions with a light-and-dark pattern that cannot be observed under normal observation conditions.

Referring to FIGS. 3 and 4, there is described the case where either the first birefringent region 34a or the second birefringent region 34b has an alignment parallel to the optical transmission axis of the polarizing plate. However, even when both the first birefringent region 34a and the second birefringent region 34b have an alignment non-parallel to the optical transmission axis of the polarizing plate, the difference in luminance is observed between the light outputted from the first birefringent region 34a and the light outputted from the second birefringent region 34b, although the contrast may be lowered. This is because the alignment direction is different between the first birefringent region 34a and the second birefringent region 34b. Further, when the anti-counterfeiting medium 100 of the present invention is observed from a slant direction, there is a slight change in the angle formed by the optical transmission axis of the polarizing plate and the first birefringent region 34a, and in the angle formed by the optical transmission axis of the polarizing plate and the alignment direction of the second birefringent region 34b. However, although a slight decrease in contrast is observed, the difference in luminance of the emission light between the first birefringent region 34a and the second birefringent region 34b can be sufficiently recognized. Accordingly, when observed through a polarizing plate, the anti-counterfeiting medium 100 of the present invention displays an inimitable image that is a combination of a hue pattern that can be observed under normal observation conditions with a light-and-dark pattern that cannot be observed under normal observation conditions. In the anti-counterfeiting medium 100 of the present invention, the OVD forming layer 20 provides an image formed of a single hue instead of an iridescent image obtained through an ordinary diffraction grating. Therefore, a light-and-dark pattern due to the latent image layer 30 can be easily recognized. Additionally, by arranging both the first and second birefringent regions 34a and 34b above the first region 110 exhibiting a hue different from that of the illumination light, the pattern due to the hue difference can be superimposed on the pattern due to light and darkness to impart the anti-counterfeiting medium 100 of the present invention with further design properties.

There has been described so far the case in which the OVD forming layer 20 is composed of one first region 110 and one second region 120, and the latent image layer has two kinds of regions, that is, the first birefringent region 34a and the second birefringent region 34b. However, a person skilled in the art would readily understand that the present invention is also effective when the OVD forming layer 20 includes plural first regions 110, when the OVD forming layer 20 includes plural second regions 120, and when the latent image layer 30 includes three or more kinds of regions. In the case where the latent image layer 30 includes three or more kinds of regions, by arranging at least two of the three or more kinds of regions above the first region 110, the pattern due to the hue difference can be superimposed on the pattern due to light and darkness to impart the anti-counterfeiting medium 100 of the present invention with further design properties.

Figure 6:
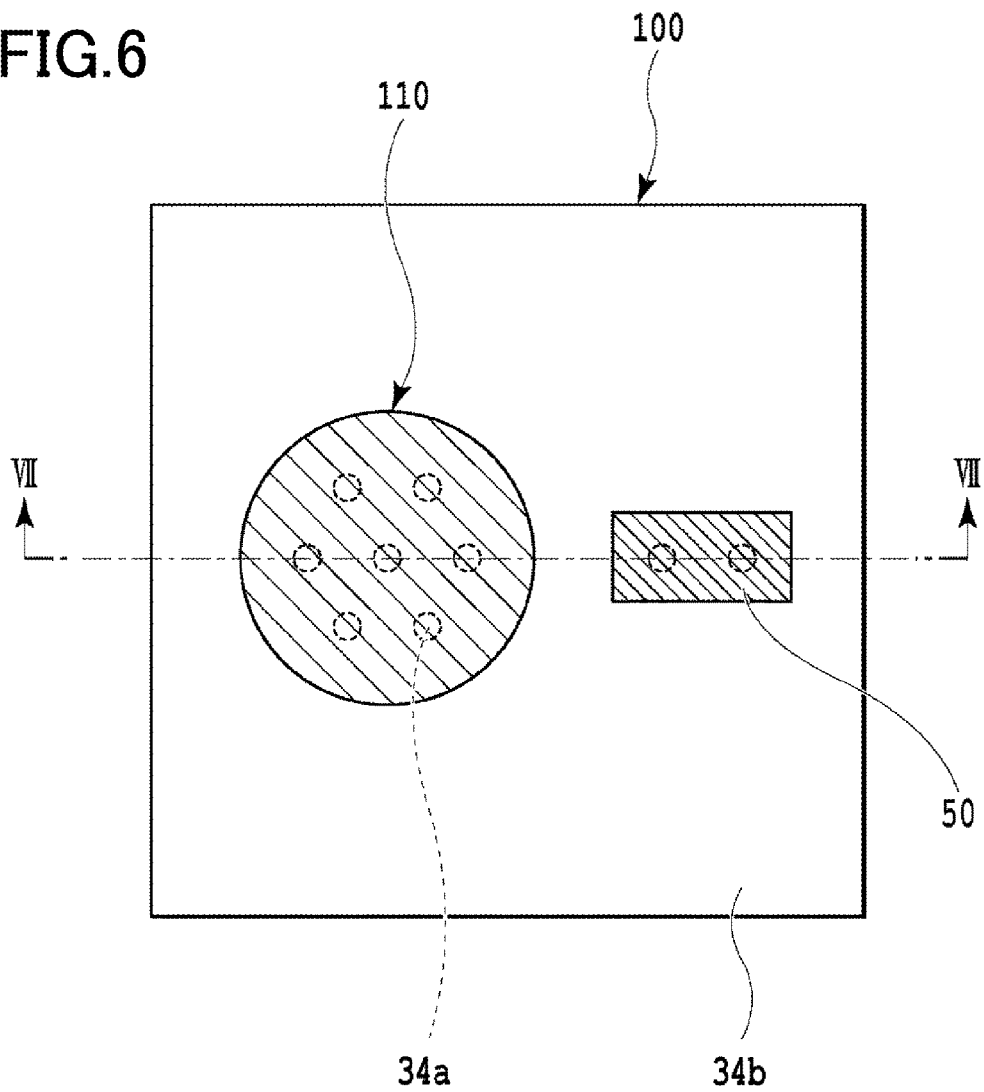
FIG. 6 is a top view of an anti-counterfeiting medium observed under unpolarized illumination light, according to a second configuration example of the present invention.
Figure 7:
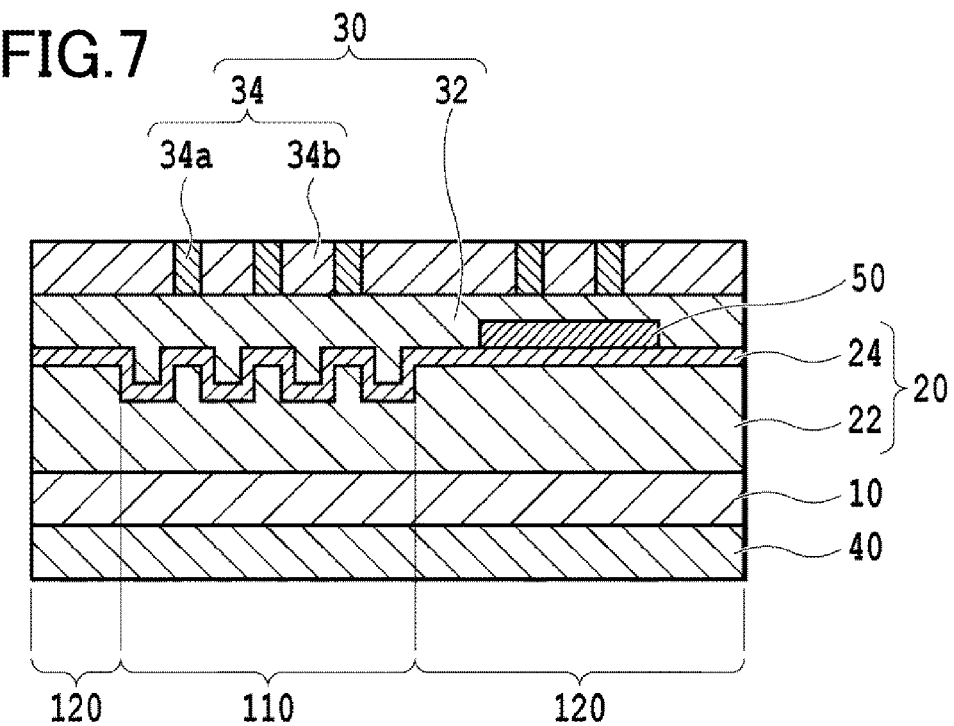
FIG. 7 is a cross-sectional view of the anti-counterfeiting medium taken along the line VII-VII, according to the second configuration example of the present invention.

The anti-counterfeiting medium of the present invention may further include a printed layer. FIG. 6 shows a top view of an anti-counterfeiting medium 100 of a second configuration example of the present invention further including a printed layer, observed under unpolarized illumination light as viewed perpendicular to the medium, and FIG. 7 shows a cross-sectional view taken along the line VII-VII of FIG. 6. The anti-counterfeiting medium 100 of the second configuration example of the present invention shown in FIGS. 6 and 7 includes a printed layer 50 provided between the OVD forming layer 20 and the latent image layer 30 in the second region 120 of the anti-counterfeiting medium 100 of the first configuration example.

The printed layer 50 displays images such as characters, pictures, designs, logos, marks, or the like. The printed layer 50 may be formed using any printing technique known in the art. The printed layer 50 is formed by using any ink, such as offset ink, letterpress ink, gravure ink, etc., known in the art, depending on the printing technique. Furthermore, an image may be formed by ink-jet printing, printing by thermal transfer, or printing by a printer using toner. A printed layer 50 for displaying an image of plural colors may be provided using inks of plural colors. Since the printed layer 50 exhibits color development unique to the colorant contained in the ink, the color does not change depending on the observation conditions such as observation angle. Alternatively, a laser may be used to remove the metal of the reflecting layer 24 and form an image. During image formation using a laser, traces remain in the alignment film 32 and/or the uneven-structure-forming layer 22 due to the heat generated in the reflecting layer 24. Therefore, even if only the reflecting layer 24 is tampered with, the traces remaining in the tampered layer would deviate from the traces in other layers. Based on this deviation, tampering can be detected.

Figure 8:
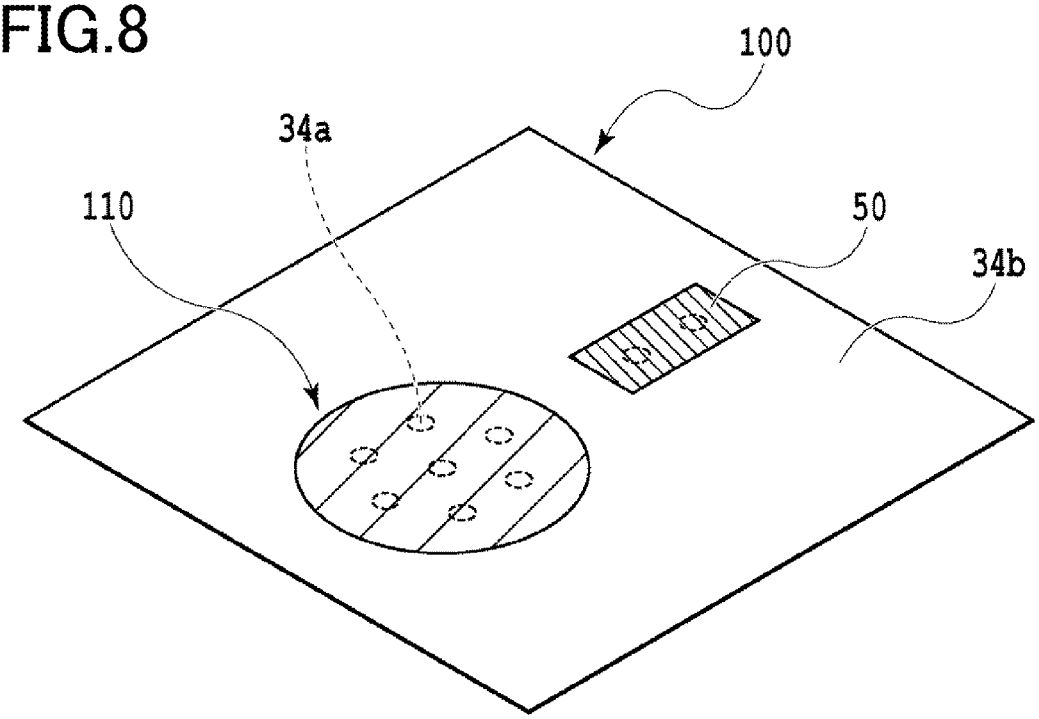
FIG. 8 is a top view of the anti-counterfeiting medium observed under unpolarized illumination light from a significantly slant direction, according to the second configuration example of the present invention.

When using a printed layer 50 for displaying a single color, the printed layer 50 may preferably exhibit substantially the same color as the color produced by the first region 110 of the OVD forming layer 20 under observation in unpolarized illumination light in a direction perpendicular to the layer. In this case, as shown in FIG. 6, under observation in unpolarized illumination light in a direction perpendicular to the layer, the first region 110 of the OVD forming layer 20 and the printed layer 50 exhibit substantially the same color, and cannot be distinguish. However, as shown in FIG. 8, when observed in unpolarized illumination light from extremely slant direction, the color exhibited by the first region 110 of the OVD forming layer 20 changes depending on the observation angle, in contrast to the printed layer 50 exhibiting a color that remains unchanged. Namely, under the condition of FIG. 8, the first region 110 of the OVD forming layer 20 can be clearly distinguished from the printed layer 50. Accordingly, the anti-counterfeiting medium 100 of the second configuration example of the present invention having the printed layer 50 exerts a higher counterfeiting resistance in combination with the visualization of a latent image, based on the observation using a polarizing plate described later, by higher anti-counterfeiting medium.

FIGS. 6 and 7 show an example in which the reflecting layer 24 is provided over the entire surfaces of the first region 110 and the second region 120 of the OVD forming layer 20, and the printed layer 50 is provided between the OVD forming layer 20 and the latent image layer 30 in the second region of the OVD forming layer 20. In the case where the reflecting layer 24 is not provided to the second region 120 of the OVD forming layer 20 and the support substrate 10 is transparent, the printed layer 50 may be provided on the surface of the support substrate 10 on a side opposite to the surface on which the OVD forming layer is provided (e.g., between the support substrate 10 and the adhesive layer 40).

Next, the following description addresses how the anti-counterfeiting medium 100 of the second configuration example of the present invention appears when observed through a polarizing plate.

Figure 9:
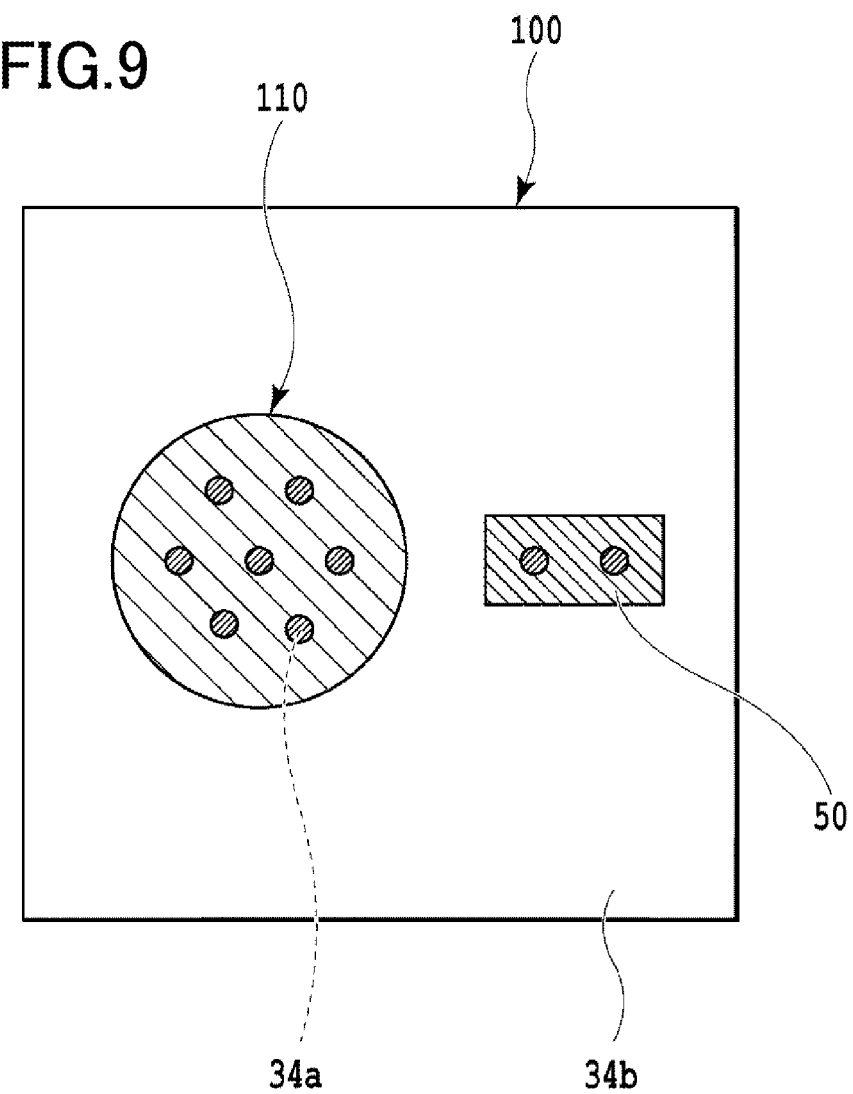
FIG. 9 is a top view of the anti-counterfeiting medium observed through the polarizing plate in the first condition, according to the second configuration example of the present invention.

FIG. 9 shows the anti-counterfeiting medium 100 observed through the polarizing plate in the first condition. The example of FIG. 9 shows the optical transmission axis of the polarizing plate being parallel to the optical axis of the birefringent material in the second birefringent region 34b. As described in the first configuration example, the polarization direction of the second birefringent region 34b does not change in the second birefringent region, so that the second birefringent region 34b is recognized as a bright region.

The optical axis of the birefringent material in the first birefringent region 34a is not parallel to the optical transmission axis of the polarizing plate. As described in the first configuration example, the polarization direction rotates in the first birefringent region 34a, so that the first birefringent region 34a is recognized as a dark region. Furthermore, due to the unevenness of the OVD forming layer 20 (the uneven-structure-forming layer 22 and the reflecting layer 24), the difference in hue between the first region 110 and the second region 120 can be continuously observed. Furthermore, the printed layer 50 exhibits substantially the same color as the first region 110 of the OVD forming layer 20.

Therefore, the anti-counterfeiting medium of the present invention displays an inimitable image that is a combination of a hue pattern that can be observed under normal observation conditions due to the OVD forming layer 20 and the printed layer 50 with a light-and-dark pattern that cannot be observed under normal observation conditions due to the latent image layer 30. In the example shown in FIG. 9, a light-and-dark pattern due to the latent image layer 30 can be observed in a colored portion due to the OVD forming layer 20 and the printed layer 50.

Figure 10:
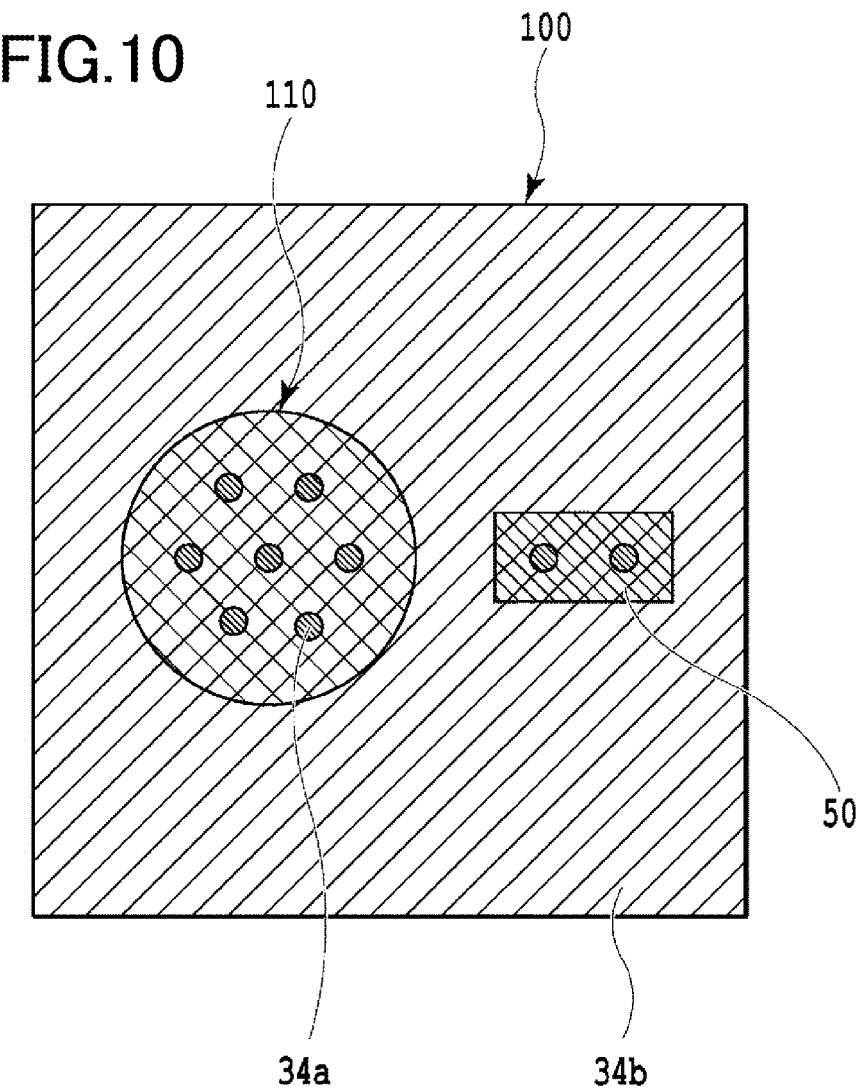
FIG. 10 is a top view of the anti-counterfeiting medium observed in the second condition different from the first condition, according to the second configuration example of the present invention.

FIG. 10 shows the anti-counterfeiting medium 100 observed through a polarizing plate in the second condition that is different from the first condition. The example of FIG. 10 shows the optical transmission axis of the polarizing plate being parallel to the optical axis of the birefringent material in the first birefringent region 34a. In this case, in contrast to FIG. 9, the first birefringent region 34a is recognized as a bright region, and the second birefringent region 34b is recognized as a dark region. Namely, a light-and-dark pattern due to the latent image layer 30 is inverted. However, the coloration condition in the OVD forming layer 20 and in the printed layer 50 remains unchanged. That is, even in the condition shown in FIG. 10, the observer can observe the latent image (the configurations of the first and second birefringent regions 34a and 34b), and the difference in hue between the first region 110 and the second region 120. In the example shown in FIG. 10, a light-and-dark pattern due to the latent image layer 30 can be observed in a colored portion due to the OVD forming layer 20 and the printed layer 50.

Therefore, the anti-counterfeiting medium 100 according to the second configuration example of the present invention displays an inimitable image that is a combination of a light-and-dark pattern that changes depending on the rotation of the light transmission axis of the polarizing plate with a hue pattern that can be observed under normal observation conditions.

Referring to FIGS. 9 and 10, there has been described the case where either the first birefringent region 34a or the second birefringent region 34b has an alignment parallel to the optical transmission axis of the polarizing plate. However, even when both the first birefringent region 34a and the second birefringent region 34b have an alignment non-parallel to the optical transmission axis of the polarizing plate, the difference in luminance is observed between the light outputted from the first birefringent region 34a and the light outputted from the second birefringent region 34b, although the contrast may be lowered. This is because the alignment direction is different between the first birefringent region 34a and the second birefringent region 34b. Therefore, when observed through a polarizing plate, the anti-counterfeiting medium 100 of the second configuration example of the present invention displays an inimitable image that is a combination of a hue pattern that can be observed under normal observation conditions with a light-and-dark pattern that cannot be observed under normal observation conditions.

Further, when the anti-counterfeiting medium 100 of the present invention is observed from a slant direction, there is a slight change in the angle formed by the optical transmission axis of the polarizing plate and the first birefringent region 34a, and in the angle formed by the optical transmission axis of the polarizing plate and the alignment direction of the second birefringent region 34b. However, although a slight decrease in contrast is observed, the difference in luminance of the emission light between the first birefringent region 34a and the second birefringent region 34b can be sufficiently recognized. In addition, as described above, when observed from a slant direction, the color exhibited by the printed layer 50 does not change, but the color exhibited by the first region 110 of the OVD forming layer 20 changes. Therefore, when observed through a polarizing plate from a slant direction, the anti-counterfeiting medium 100 of the second configuration example of the present invention displays an inimitable image that is a combination of a hue pattern that is different from the pattern when observed from vertically above the polarizing plate with a light-and-dark pattern due to the latent image layer 30.

In the anti-counterfeiting medium 100 of the second configuration example of the present invention, the OVD forming layer 20 provides an image formed of a single hue instead of an iridescent image obtained through an ordinary diffraction grating. Therefore, a light-and-dark pattern due to the latent image layer 30 can be easily recognized. Since the hue of the image provided by the printed layer 50 does not change depending on the observation direction, a light-and-dark pattern due to the latent image layer 30 can be easily recognized. Additionally, by arranging both the first and second birefringent regions 34a and 34b above the first region 110 exhibiting a hue different from that of the illumination light, and above the printed layer 50, the pattern due to the hue difference can be superimposed on the pattern due to light and darkness to impart the anti-counterfeiting medium 100 of the present invention with further design properties.

EXAMPLES

Example 1

A photo-curable resin was applied to a support substrate 10 formed of a PET film having a thickness of 25 μm to form a photo-curable resin layer having a thickness of 2 μm. The photo-curable resin layer was cured by pressing a metal stamper prepared separately against the photo-curable resin layer and applying light having a wavelength in the range of 365 to 436 nm to the photo-curable resin layer from the support substrate 10 side. Subsequently, the metal stamper was removed to obtain an uneven-structure-forming layer 22. The obtained uneven-structure-forming layer 22 had a first region 110 including plural convexities each having a long side dimension of 0.8 μm, a short side dimension of 0.8 μm, and a height of 0.26 μm, and a second region 120 including a flat surface substantially flush with upper surfaces of the plural convexities. The plural convexities for the first region 110 were orderly arranged in a hexagonal lattice shape at a 2.4-μm pitch. The area occupied by the plural convexities in the first region 110 was 26%.

On the obtained uneven-structure-forming layer 22, an aluminum layer was vapor-deposited to form a reflecting layer 24 with a thickness of 50 nm to thereby obtain an OVD forming layer 20.

Next, the OVD forming layer 20 was coated with a photo-alignment agent IA-01 (manufactured by DIC Corporation) by microgravure coating to form an aligning agent coating film. Next, the aligning agent coating film was irradiated with linearly polarized first ultraviolet light having a wavelength of 365 nm through a photomask. Subsequently, the entire surface of the aligning agent coating film was irradiated with linearly polarized second ultraviolet light having a wavelength of 365 nm to form an alignment film 32 having a thickness of 0.1 μm resulting from two different alignment processes. The angle between the polarization direction of the first ultraviolet light and the polarization direction of the second ultraviolet light was 45°. The thickness of the alignment film 32 corresponds to the thickness of the uneven-structure-forming layer 22 in the second region 120.

Subsequently, the alignment film 32 was coated with a UV-curable liquid crystal UCL-008 (manufactured by DIC Corporation) by microgravure coating method to form a liquid crystal material film. Subsequently, the liquid crystal material film was heated to 90° C. for alignment. Finally, ultraviolet light at 0.5 J/m2 was applied to the resultant object in a nitrogen gas atmosphere to cure the liquid crystal material and to form a birefringent layer 34 having a thickness of 0.8 thereby obtaining a latent image layer 30. Thus, first birefringent regions 34a were formed on the alignment film 32 irradiated with the first ultraviolet light, and a second birefringent region 34b was formed on the alignment film 32 irradiated with only the second ultraviolet light.

Subsequently, an adhesive was applied to the back surface of the support substrate 10 (the surface having no uneven-structure-forming layer 22) to form an adhesive layer 40, thereby obtaining an anti-counterfeiting adhesive label. Finally, a separator film was laminated on the obtained label to protect the exposed surface of the adhesive layer 40.

Example 2

The same procedure as in Example 1 was used to form an OVD forming layer 20 on a support substrate 10.

An ink containing an organic pigment as a colorant was adhered to a part of the surface of the OVD forming layer 20 located above the second region 120 to form a printed layer.

Subsequently, the same procedure as in Example 1 was used to form a latent image layer 30 and an adhesive layer 40 to obtain an anti-counterfeiting adhesive label.

Comparative Example 1

A urethane resin was applied to a support substrate formed of a PET film having a thickness of 25 µm to form a urethane resin layer having a thickness of 1 µm. Subsequently, a relief structure was formed on the surface of the urethane resin layer by using a roll embossing method to obtain an uneven-structure-forming layer for creating a normal iridescent diffractive structure image. Subsequently, an aluminum layer was deposited on the obtained uneven-structure-forming layer by vapor deposition to form a reflecting layer having a thickness of 50 nm, thereby obtaining an OVD forming layer.

Subsequently, the same procedure as in Example 1 was used to form a latent image layer 30 and an adhesive layer 40 to obtain an anti-counterfeiting adhesive label.

(Evaluation)

The anti-counterfeiting adhesive labels of Example 1, Example 2, and Comparative Example 1 were attached to an article (a golf club) for observation under unpolarized illumination light and observation through a linear polarizing plate.

When the anti-counterfeiting adhesive label of Example 1 was observed under unpolarized illumination light, the first region 110 of cyan color and the second region 120 of magenta color due to the OVD forming layer 20 were visually recognized. The first region 110 of the OVD forming layer 20 was visually recognized as a cyan region without so-called iridescence unlike in the anti-counterfeiting medium of Comparative Example 1. Furthermore, in the observation through a linear polarizing plate, a light-and-dark pattern corresponding to the configurations and arrangements of the first and second birefringent regions 34a and 34b could be visually recognized, in addition to the colored pattern of the OVD forming layer 20. Further, by rotating the linear polarizing plate, the change in a light-and-dark pattern was visually recognized.

When the anti-counterfeiting adhesive label of Example 2 was observed under unpolarized illumination light, the first region 110 of cyan color and the second region 120 of magenta color due to the OVD forming layer 20, and magenta color due to the printed layer 50 were visually recognized, as in the anti-counterfeiting adhesive label of Example 1. The first region 110 of the OVD forming layer 20 was visually recognized as a cyan region without so-called iridescence unlike in the anti-counterfeiting medium of Comparative Example 1. Furthermore, under unpolarized illumination light, the color in the first region 110 of the OVD forming layer 20 changed from cyan to blue, with the change in the observation angle from vertically above to a slant direction. The color of the printed layer 50 did not change depending on the observation angle. Furthermore, in the observation through a linear polarizing plate, a light-and-dark pattern corresponding to the configurations and arrangements of the first and second birefringent regions 34a and 34b could be visually recognized, in addition to the colored pattern of the OVD forming layer 20. Further, by rotating the linear polarizing plate, the change in a light-and-dark pattern was visually recognized.

When the anti-counterfeiting adhesive label of Comparative Example 1 was observed under unpolarized illumination light, iridescence due to the uneven-structure-forming layer was visually recognized at the front surface of the label. However, in the observation through the linear polarizing plate, a light-and-dark pattern corresponding to the configurations and arrangements of the first and second birefringent regions 34a and 34b could not be clearly and visually recognized due to the iridescence caused by the uneven-structure-forming layer. Even when the linear polarizing plate was rotated, the change in a light-and-dark pattern could not be visually recognized.

REFERENCE SIGNS LIST

10 . . . Support substrate; 20 . . . OVD forming layer; 22 . . . Uneven-structure-forming layer; 22p . . . Convexity; 22f . . . Flat part; 24 . . . Reflecting layer; 30 . . . Latent image layer; 32 . . . Alignment film; 34 . . . Birefringent layer; 34a . . . First birefringent region; 34b . . . Second birefringent region; 40 . . . Adhesive layer; 50 . . . Printed layer; 100 . . . Anti-counterfeiting medium; 110 . . . First region; 120 . . . Second region.

What is claimed is:

1. An anti-counterfeiting medium, comprising:
   a support substrate,
   an OVD forming layer, and
   a latent image layer, in this order;
   wherein the latent image layer includes a birefringent material;
   wherein the latent image layer has plural regions with optical axes of the birefringent material aligned in directions different from each other;
   wherein the OVD forming layer includes, in order from the support substrate side, an uneven-structure-forming layer and a reflecting layer;
   wherein the uneven-structure-forming layer consisting of one or more first regions and one or more second regions;
   wherein the reflecting layer is directly on the uneven-structure-forming layer, the reflecting layer consists of one or more first regions, which correspond to the one or more first regions of the uneven-structure-forming layer, and one or more second regions, which correspond to the one or more second regions of the uneven-structure-forming layer;

wherein each of the one or more first regions of the uneven-structure-forming layer or the reflecting layer is selected from a group consisting of: (a) a region made up of a flat part substantially parallel to a surface of the support substrate, and plural convexities each having an upper surface substantially parallel to a surface of the support substrate; and (b) a region made up of a flat part substantially parallel to a surface of the support substrate, and plural concavities each having a bottom surface substantially parallel to a surface of the support substrate;

wherein each of the second regions of the of the uneven-structure-forming layer or the reflecting layer is a flat part substantially parallel to a surface of the support substrate;

wherein each of the plural convexities has a long side dimension of 0.3 µm or more and 10 µm or less, a short side dimension of 0.3 µm or more and 10 µm or less, and a depth of 0.1 µm or more and 0.5 µm or less;

wherein each of the plural concavities has a long side dimension of 0.3 µm or more and 10 µm or less, a short side dimension of 0.3 µm or more and 10 µm or less, and a depth of 0.1 µm or more and 0.5 µm or less; and wherein in each of the one or more first regions:
(1) the plural convexities or concavities occupy an area of 20% or more and 80% or less with respect to an area of the first region,
(2) the plural convexities or the plural concavities are orderly arranged, and
(3) the plural convexities have a substantially uniform height or the plural concavities have a substantially uniform depth.

2. The anti-counterfeiting medium of claim 1, wherein the latent image layer includes, in order from the OVD forming layer side, an alignment film and a birefringent layer containing the birefringent material.

3. The anti-counterfeiting medium of claim 1, wherein the birefringent material is a liquid crystal material.

4. The anti-counterfeiting medium of claim 1, wherein at least two of plural regions of the latent image layer are arranged above each of the one or more first regions.

5. The anti-counterfeiting medium of claim 1, wherein the medium further comprises a printed layer, and the printed layer is provided on a surface of the support substrate on a side opposite to the surface on which the OVD forming layer is provided, or the printed layer is provided between the OVD forming layer and the latent image layer.

6. An anti-counterfeiting adhesive label wherein the label includes the anti-counterfeiting medium of claim 1 and an adhesive layer, and the adhesive layer is provided to a support substrate side of the anti-counterfeiting medium.

* * * * *